United States Patent [19]

Grimes

[11] 4,139,207
[45] Feb. 13, 1979

[54] DOUBLE GRIP AIR CHUCK

[76] Inventor: Larry E. Grimes, 6649 St. James, Indianapolis, Ind. 46227

[21] Appl. No.: 873,145

[22] Filed: Jan. 30, 1978

[51] Int. Cl.² .............................................. B23B 31/30
[52] U.S. Cl. ...................................... 279/4; 279/1 D; 279/1 L; 92/76
[58] Field of Search ............. 279/4, 1 D, 1 L, 1 DA; 92/76, 68, 106

[56] References Cited

U.S. PATENT DOCUMENTS

| 2,667,356 | 1/1954 | Forward | 279/4 |
|---|---|---|---|
| 2,932,284 | 4/1960 | Stace et al. | 92/59 |
| 2,958,532 | 11/1960 | Benjamin et al. | 279/1 D |

*Primary Examiner*—Gil Weidenfeld
*Attorney, Agent, or Firm*—Jenkins, Coffey & Hyland; Jenkins, Coffey & Hyland

[57] ABSTRACT

A fluid actuated chuck has two pairs of surfaces adaptable to engage a work piece with each of said pairs of surfaces being independently operable by the fluid. Such a chuck body includes means forming two pairs of surfaces carried and rotatably driven by the chuck body. Each of said surfaces of each of said pairs is free to move independently of the others. The chuck body also includes a pair of cylinders and passageways to deliver fluid thereto and carries a pair of pistons with one piston in each cylinder. Each of the pistons is free to move in the direction of the axis of rotation in response to fluid pressure within its cylinder. A first drive train forms a mechanical link between one of said pair of pistons and one of said pairs of surfaces, and a second drive train forms a mechanical link between the other of said pair of pistons and the other of said pairs of surfaces. The first and second drive trains transmit movement of said pair of pistons in response to the application of fluid to said chuck independently to said one pair of surfaces and to said other pair of surfaces to permit engagement and rotation of the work piece.

10 Claims, 4 Drawing Figures

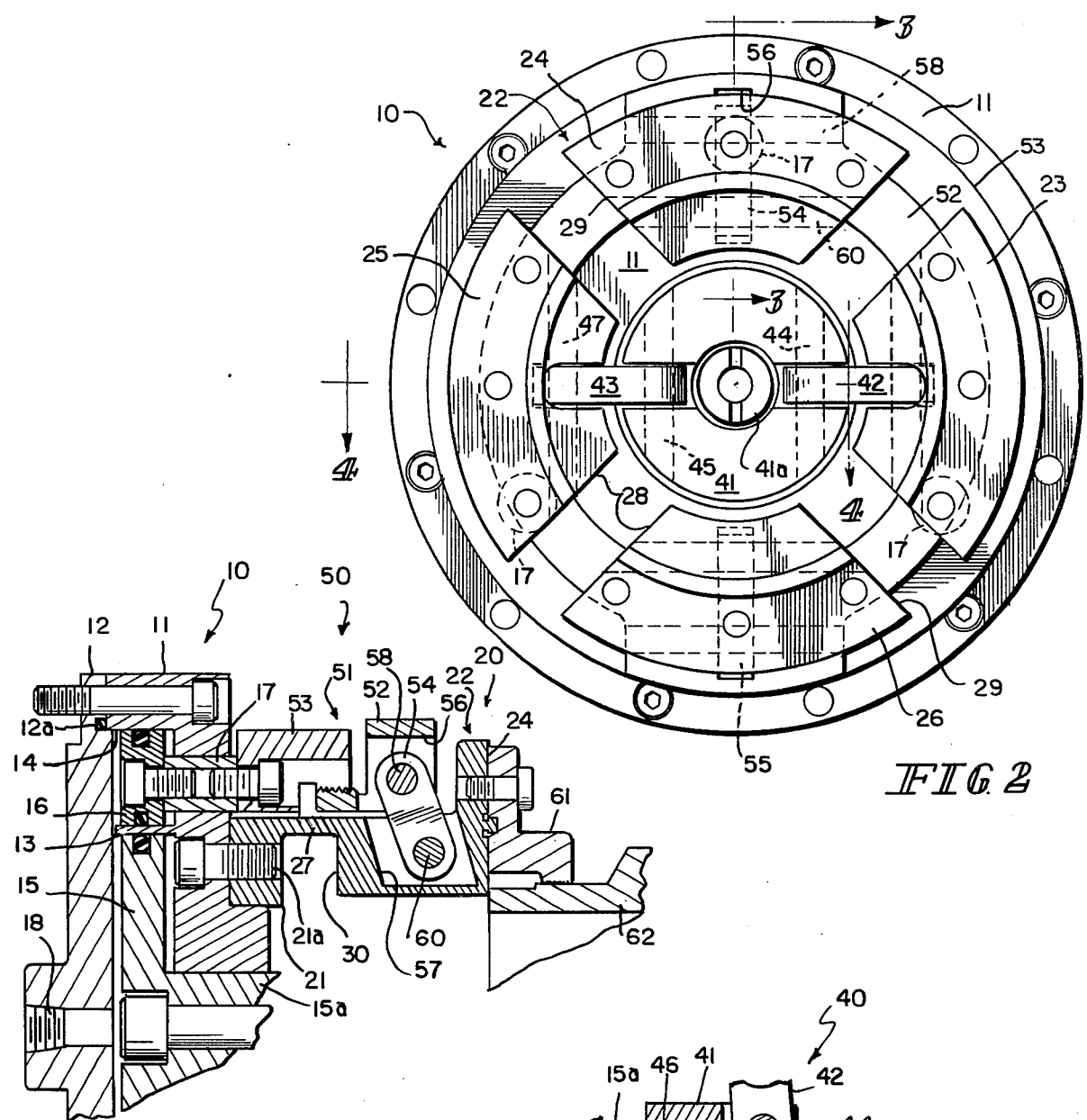

DOUBLE GRIP AIR CHUCK

This invention is directed to a fluid actuated chuck which can be automatically operated to grip and center a work piece for rotation about an axis of rotation and machining operations, and is more particularly directed to a fluid actuated chuck for use as a tool in high production machining operations with two pairs of surfaces that are capable of independent operation and engagement with a work piece.

Fluid actuated chucks are known. Examples of such chucks are disclosed, for example, in U.S. Pat. Nos. 2,932,284 and 2,784,002. With such chucks, the application of a fluid under pressure, such as compressed air, forces movement of an internal piston, and the movement of the piston is transmitted through a linkage to actuate work engaging surfaces to grip a work piece.

This invention provides a new fluid actuated chuck with two pairs of surfaces that may be adapted to engage a work piece, each pair of work engaging surfaces being independently operable and capable of independent engagement with separate surfaces of the work piece. This invention further provides the capability of simultaneous engagement with both inside and outside diameters of a work piece and still further provides, through the independent operation of each of two pairs of surfaces, automatic four-jaw engagement of a work piece having surfaces that are eccentric or "out-of-round". The invention also provides for variation in the force exerted on the work piece by the chuck, permitting substantial force to be exerted on a work piece for rapid removal of material, and lighter force to be used in gripping a thin-walled work piece to prevent its distortion by the chuck during machining.

The invention is particularly useful in fluid-actuated chucks that are adapted for high production and for precise machining of relatively accurately dimensioned and configured turnings and castings. The features of the invention permit a precise four-jaw chucking capability through the independent actuation of two pairs of jaws to permit rapid production use of the chuck; in addition, the chuck may be inexpensively manufactured and reliably operated in high production use.

In accordance with the invention, an automatically operated chuck can be manufactured to grip and rotate a work piece about an axis of rotation. The chuck body carries and rotatably drives two pairs of surfaces, each of the surfaces of each of the pairs being independently movable and adaptable engagement with the work piece. The chuck body forms within its interior a pair of cylinders and a passageway for the delivery of fluid under pressure to the cylinders. Carried within the pair of cylinders are a pair of pistons. The pistons are free to move in the direction of the axis of rotation of the chuck in response to fluid pressure applied within the cylinders. Means forwardly of the pistons project from the chuck body and are mechanically connected into first and second drive trains. The first and second drive trains form a mechanical linkage between the pair of pistons and each of the pairs of work engaging surfaces, and the movement of each of the pair of pistons in response to the application of fluid to the chuck is transmitted independently by the first and second drive trains to each pair of surfaces to permit engagement of the work piece for rotation and machining operations.

In its preferred embodiment, the chuck body has an inner cylindrical cavity formed within it and an outer cylindrical cavity formed within it coaxially about the inner cylindrical cavity. An inner piston is carried within the inner cylindrical cavity, and an outer piston is carried within the outer cylindrical cavity. The cylinders are closed by a back plate on said chuck body. A one-piece tubular arbor is attached forwardly of said chuck body. The tubular arbor includes a forward portion formed to provide each work engaging surface of said two pairs of surfaces and a central portion adapted to flexibly carry each such work engaging surface of said two pairs of work engaging surfaces. Means forwardly of the inner piston projects from the chuck body within the tubular arbor, and first actuating means including a pair of links mounted on a spider interconnects the forward portion of the inner piston and one pair of the work engaging surfaces at the forward portion of the tubular arbor. Means forwardly of the outer piston comprising a plurality of rods project from the chuck body outside of the tubular arbor. A second actuating means includes an actuator ring that is supported by the plurality of rods and the outer piston and is free to move in the direction of the axis of rotation of the chuck. The second actuating means also includes a pair of links interconnecting the actuator ring and the other pair of work engaging surfaces at the forward portion of the tubular arbor. The inner and outer cylinders within the chuck body communicate with and are exposed to the same source of fluid pressure, and application of fluid under pressure to the chuck simultaneously results in movement of each pair of work engaging surfaces.

The chuck can be adapted to engage either an inside diameter or an outside diameter of a work piece, or both an inside diameter and an outside diameter of the work piece, or the chuck can be adapted to otherwise engage the work piece by mounting special work engaging surfaces on the movable surfaces of the chuck. Where the chuck of this invention is described as having "work engaging surfaces", it is to be understood that such "work engaging surfaces" may be surfaces of the chuck itself configured to engage a work piece and may be surfaces of the chuck which have been precisely machined to permit the attachment thereto of work holding jaws or surfaces configured to engage a work piece.

Further features and advantages of the invention will be apparent from the following drawings and description.

FIG. 2 is a front elevational view of the chuck of FIG. 1;

Figure 1:
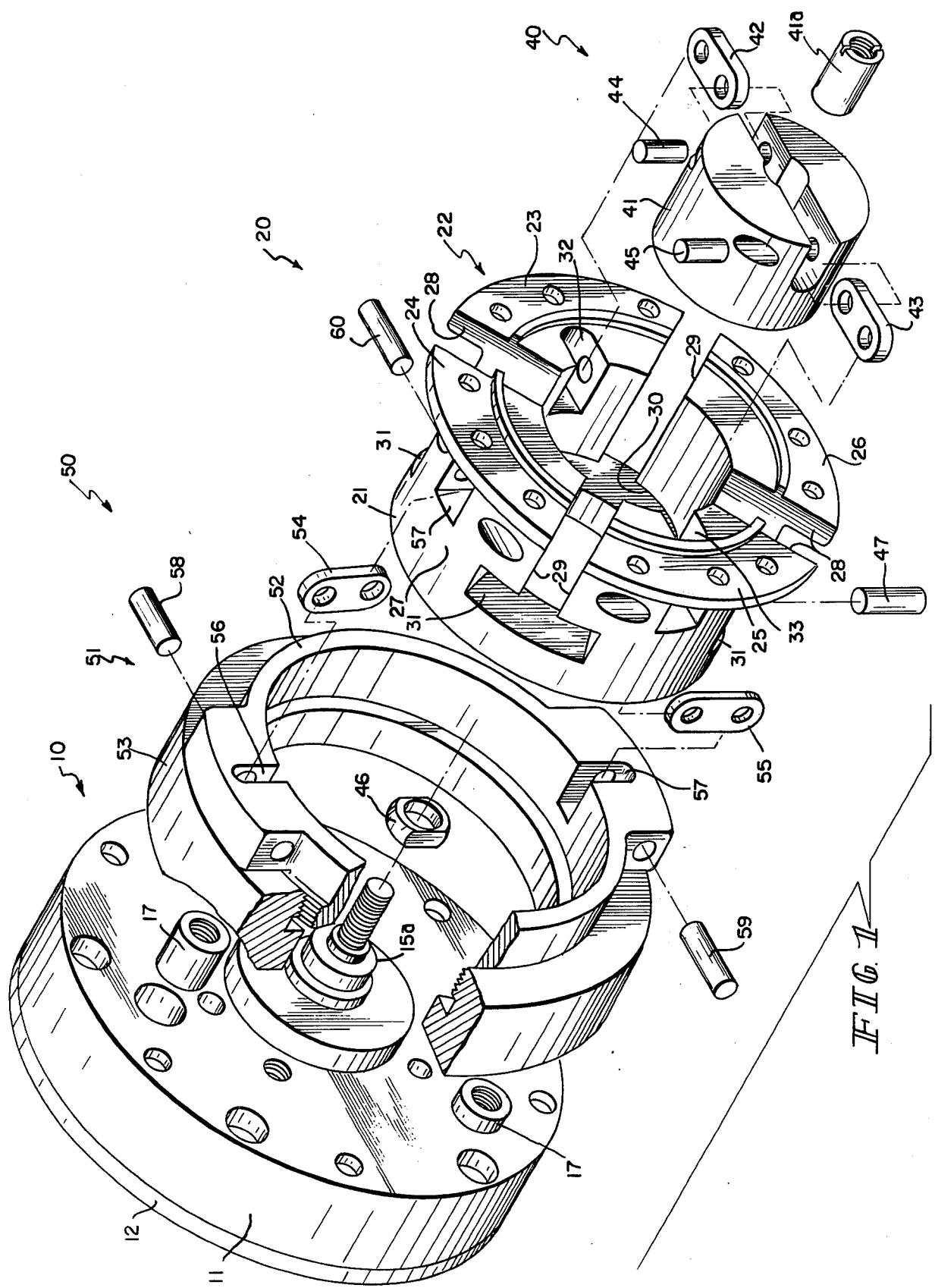
FIG. 1 is an exploded view of a chuck of this invention.

FIG. 3 is a partial sectional view of the chuck of FIGS. 1 and 2 taken along line 3—3 of FIG. 2; and FIG. 4 is a partial sectional view of the chuck of FIGS. 1 and 2 taken along line 4—4 of FIG. 2.

Referring now to FIG. 1, a chuck of this invention includes a chuck body 10. The chuck body 10 includes a cylinder housing 11 and a back plate 12. As shown in FIGS. 3 and 4, the cylinder housing 11 is machined to form an inner cylinder 13 and an outer cylinder 14. The outer cylinder 14, as shown in FIGS. 3 and 4, is machined into cylinder housing 11 coaxially and concentrically about the inner cylinder 13. An inner piston 15 is carried within the inner cylinder 13, and an outer piston 16 is carried within the outer cylinder 14. The cylinders are closed and sealed by the back plate 12 attached at the rear of the cylinder housing 11 and carrying an O-ring sealing means 12a. Means 15a of and inner piston 15 projects from the chuck body 10 forwardly through cylinder housing 11 as shown in FIG. 4. Means 17 forwardly of the outer piston 16, including three rods, project from the chuck body 10 forwardly through cylinder housing 11 as shown in FIGS. 1 and 3. The means forwardly of the pair of the pistons 15 and 16 may be a portion of the pistons themselves (such as portion 15a of piston 15) or separate rods connected to the pistons forwardly thereof. Back plate 12 is formed with passage 18 to permit a fluid under pressure to be applied within the chuck body 10 for actuation of the pistons 15 and 16. Pistons 15 and 16 each carry a peripheral O-ring seal in a manner known in the art, and both inner piston 15 and outer piston 16 are free to move within their respective cylinders 13 and 14 along and in the direction of the axis of rotation of the chuck body 10.

Mounted on the forward portion of chuck body 10, as shown in FIGS. 1, 3 and 4, is an arbor 20. Arbor 20 is preferably tubular in form. Arbor 20 includes a rigid rear portion 21 which is attached to chuck body 10, for example, by threaded fasteners 21a as shown in FIG. 3. Arbor 20 also includes a forward portion 22 as shown in FIG. 1, formed to provide four surfaces 23, 24, 25, and 26. Each of the surfaces 23, 24, 25 and 26 is flexibly supported from the rear portion 21 of the arbor 20 by the central portion 27 of the arbor.

The four surfaces 23, 24, 25 and 26 are formed by two slots 28 and 29 cut into the tubular arbor 20 perpendicular to and through its central axis and perpendicular to each other, as shown in FIG. 1. The central portion 27 of tubular arbor 19 is undercut on the inside as at 30 shown in FIGS. 1, 3 and 4. In addition, at the base of each of the slots 28 and 29 and in the central portion 27 of the arbor, four peripheral slots 31 may be cut through the thickness of the arbor. The undercut 30, and if needed the peripheral slots 31, define the central portion 27 of the arbor by providing flexible support of each of the surfaces 23, 24, 25 and 26. Thus, the central portion of the arbor 27 can be provided with sufficient flexibility to permit independent movement of surfaces 23, 24, 25 and 26 generally toward and away from the axis of rotation of the arbor 20 and the chuck body 10. Although surfaces 23, 24, 25 and 26 are shown to be adapted to carry separate work engaging surfaces 61 as shown in FIGS. 3 and 4, the forward portion of the arbor may be formed to engage the work piece directly if so desired.

By making the arbor 20 preferably from a single piece of material, as shown, it is possible to obtain high precision in the location of, and in the repeatability of movement of, the work engaging surfaces. Providing movement of the work engaging surfaces through flexure of the central portion 27 of the arbor 20 eliminates the plurality of interfitting parts found in many chucks and the imprecision incorporated into such chucks through the tolerances needed to provide the interfitting and movement of their parts. In addition, a plurality of one-piece arbors may be mounted and used interchangeably on the chuck body to provide flexibility in using the chuck to machine a number of differently configured work pieces.

As shown in FIGS. 1 and 4, the forward portion of inner piston 15a projects forwardly from the chuck body 10 within the tubular arbor 20. Mounted on the forward portion 15a of the inner piston, as shown in FIGS. 1 and 4, is a first actuating means 40. The first actuating means includes a spider 41 and a pair of links 42 and 43. Fastening means 41a attaches the first actuating means 40 to the inner piston. The links 42 and 43 are connected to spider 41 by pins 44 and 45 at one end and at the other end are connected to the forward portion 22 of the arbor 20 within slots 32 and 33 formed therein, as, for example, by pin 47 and another pin which is not shown. Surfaces 23 and 25 are thus mechanically connected with the inner piston 15. The spider 41 is preferably mounted on means 46 forming a spherical bearing surface. With spider 41 so mounted, variation in the dimensions and concentricity of the parts of the chuck making up the mechanical interconnection between the inner piston 15 and the surfaces 23 and 25 may be accommodated upon assembly of the chuck.

As shown in FIGS. 1 and 3, the means 17 including three rods project forwardly of the outer piston 16 from the chuck body 10 outside of the arbor 20. Mechanically connected to and carried by the means 17 is a second actuating means 50. The second actuating means 50 includes an actuator ring 51, including a forward ring 52 and a mounting ring 53 that are threaded together, and a pair of links 54 and 55. The pair of links 54 and 55 are pivotally carried within slots 56 and 57 formed in the forward ring 52 by pins 58 and 59 at one end. The links 54 and 55 are similarly connected at the other end by pins to the forward portion 22 of arbor 20 within slots. Only one slot, slot 57, and only one pin, pin 60, are shown in FIGS. 1 and 3. Surfaces 24 and 26 are thus mechanically connected to the outer piston 16. The second actuating means 50 is carried outside of arbor 20 by outer piston 16 and is free to move along and in the direction of the axis of rotation of the arbor 20 and the chuck body 10.

In its preferred embodiment, the assembled chuck thus has two independent drive trains for the two pairs of work engaging surfaces. One drive train is located along the axis of rotation of the chuck within the tubular one-piece arbor 20 and comprises the inner piston 15, the means 15a forwardly of the inner piston 15 projecting through the chuck body 10, and the first actuating means 40. This inner drive train is connected to and operates the pair of surfaces 23 and 25 that are formed in the forward portion 22 of arbor 20. The second drive train is located coaxially about the first drive train outside at the tubular one-piece arbor 20 and comprises the outer piston 16, the means 17 forwardly of the outer piston 16 projecting through the chuck body 10, and the second actuating means 50 carried by the outer piston 16. This outer drive train is connected to and operates the pair of surfaces 24 and 26 that are formed in the forward portion 22 of the tubular one-piece arbor.

Operation of a chuck of this invention is best illustrated by FIGS. 3 and 4. As compressed air is admitted through passage 18 in the back of chuck body 10, the pressurized fluid flows into the chamber formed by the inner cylinder 13 and the outer cylinder 14 of the cylinder housing 11 and by the back plate 12. Under the influence of the fluid pressure within this chamber, pistons 15 and 16 move forwardly along the axis of rotation of the chuck within their respective cylinders 13 and 14, simultaneously operating the inner and outer drive trains. As shown in FIG. 4, as inner piston 15 moves forwardly within the cylinder housing 11, it drives the first actuating means 40 forwardly, and as spider 41 of the first actuating means moves forwardly, links 42 and 43 pull surfaces 23 and 25 toward the axis of rotation of the chuck and toward each other. Likewise as shown in FIG. 3, as the outer piston 16 is forced forwardly in response to the fluid pressure within the chuck body 10, it drives the second actuating means 50 forwardly and as the actuator ring 51 of the second actuating means 50 moves forwardly, the pair of links, including link 54, as shown in FIG. 3, push surfaces 24 and 26 toward the axis of rotation of the chuck and toward each other. The work engaging surfaces 61 are thusly driven into engagement with the work piece 62.

Since the cylinder housing 11 of the chuck body 10 and specifically that portion of cylinder housing 11 forming the outside diameter of inner cylinder 13 and the inside diameter of outer cylinder 14 permits communication of the fluid from passage 18 to both cylinders 13 and 14, pistons 15 and 16 move simultaneously thereby simultaneously driving each pair of surfaces 23 and 25 and surfaces 24 and 26, toward each other and toward the axis of rotation of the chuck. The surfaces 23, 24, 25 and 26 are typically moved on the order of 0.005 inches for gripping precision parts, but movements up to about 0.030 inches are possible and can be used in gripping castings. Preferably, the area of inner piston 15 exposed to fluid pressure and the area of outer piston 16 exposed to fluid pressure are equal so that equal forces are impressed on each pair of work engaging surfaces, but the effective areas of the pistons may be adjusted to provide other force relationships with respect to the work engaging surfaces. Piston areas on the order of thirty to forty square inches may be obtained with each piston, and mechanical advantages generally of 3 to 4 may be obtained in the inner and outer drive trains. Thus with fluid pressures of 100 pounds per square inch, forces as high as several tons may be imposed on the work piece by the work engaging surfaces of the chuck. By adjustment of the fluid pressure, the force exerted on the work piece may be adjusted to provide that force necessary to grip and rotate, but not distort, the work piece.

In the specific embodiment illustrated, the surfaces 23, 24, 25 and 26 are all driven toward the axis of rotation, as shown in FIGS. 3 and 4, providing an engagement of a work surface 62 at an outer diameter. The first and second actuating means can, however, be arranged to drive surfaces 23, 24, 25 and 26 simultaneously away from the axis of rotation of the chuck thereby providing engagement of the work piece at an inside diameter.

Such operation can be obtained by locating the end of links 42 and 43 attached to spider 41 of the first actuating means 40 rearwardly of their point of connection to the arbor, for example, rearwardly of pin 47, as shown in FIG. 4, so that upon the forward movement of inner cylinder 15, the links 42 and 43 press outwardly upon the surfaces 23 and 25 of the arbor. Referring to FIG. 3, in like manner, if the point of connection of links 54 and 55 to the actuator ring 51 were located forwardly of their point of connection to the arbor, for example, forwardly of pin 60, forward motion of the actuator ring 51 in response to forward motion of the outer piston 16 would pull outwardly upon surfaces 24 and 26 of the arbor.

In addition, one pair of surfaces may be driven toward the axis of rotation while another pair of surfaces may be driven away from the axis of rotation to permit a chuck of this invention to simultaneously engage a work piece on an inside and an outside diameter.

The forward portion 22 of cylindrical arbor 20 and each of the surfaces 23, 24, 25 and 26 is preferably adapted to permit the attachment of special work gripping surfaces 61 as shown in FIGS. 3 and 4.

Thus a chuck of this invention can be automatically operated to provide independent actuation of two pairs of surfaces adaptable to engage a work piece. The chuck body carries each of the two pairs of surfaces and rotatably drives the surfaces about the axis of rotation. The pistons carried within the pair of cylinders within the chuck body are free to move independently along the axis of rotation in response to the introduction of fluid under pressure within the chuck body. The forward motion of each of the pistons is transmitted through drive trains and actuating means forming a mechanical link between the pistons and each surface of each pair of surfaces, and movement of the plurality of pistons in response to the fluid pressure is transmitted through the actuating means and mechanical links to move each pair of work engaging surfaces in a plane generally perpendicular to the axis of rotation.

Changes may be made in the specific embodiment illustrated and described without departing from the spirit and scope of the invention as set forth in the following claims.

The invention claimed is:

1. A fluid actuated chuck to rotate the work piece about an axis of rotation with two pairs of surfaces adaptable to engage a work piece, each of said pairs of surfaces being independently operable, said chuck comprising a chuck body including means forming two pairs of surfaces carried and rotatably driven by the chuck body, each of said surfaces of each of said pairs being independently movable;

said chuck body including a pair of cylinders and passageways to deliver fluid thereto and carrying a pair of pistons with one piston in each cylinder, each of said pistons being free to move in the direction of the axis of rotation in response to fluid pressure within its cylinder; and a first drive train forming a mechanical link between one of said pair of pistons and one of said pairs of surfaces, and a second drive train forming a mechanical link between the other of said pair of pistons and the other of said pair of surfaces;

said first and second drive trains transmitting movement of said pair of pistons in response to the application of fluid to said chuck independently to said one pair of surfaces and to said other pair of surfaces to permit engagement and rotation of the work piece.

2. The chuck body of claim 1 wherein said chuck body includes a cylinder housing having an inner cylindrical cavity formed therein and an outer cylindrical cavity formed therein coaxially about the inner cylindrical cavity, said plurality of pistons including an inner piston carried within the inner cylindrical cavity and an outer piston carried within the outer cylindrical cavity, and further includes a back plate on said cylinder housing closing the rear of said cylinders and forming a passage for fluid to said cylinders; and further includes a tubular arbor having a rear portion attached to said body, a forward portion formed into each surface of said two pairs of surfaces and a central portion adapted to movably carry each said surface;

and wherein the first drive train is located within the tubular arbor and includes a first pair of links interconnecting the inner piston and one pair of surfaces;

and wherein the second drive train is located outside of the tubular arbor and includes a second pair of links interconnecting said outer piston and the other pair of surfaces.

3. The chuck of claim 2 wherein said first drive train includes a forward portion of the inner piston projecting within the tubular arbor forwardly of its central portion and includes a spider connected to the forward portion of the inner piston and carrying said first pair of links, and the second drive train includes an actuator ring carried by the outer piston about the tubular arbor and carrying said second set of links, and the portion of the cylinder housing between the inner cylinder and the outer cylinder permits passage of fluid from the back plate simultaneously into both of said cylinders within the chuck body said surfaces simultaneously being moved toward the axis of rotation of the arbor in response thereto.

4. The chuck of claim 2 wherein the tubular arbor is formed from a single piece of material and the forward and central portions of the tubular arbor have two slots therein, each slot being perpendicular to and through the axis of rotation and perpendicular to each other, thereby forming in the forward portion of the tubular arbor each surface of the two pairs of surfaces in pairs, each pair being arranged perpendicular to the other pair, and wherein said central portion of the tubular arbor includes an undercut portion to permit the central portion to flexibly carry each of said surfaces of said two pairs of surfaces and to permit movement of said surfaces generally in a direction perpendicular to the axis of rotation, said links of said first drive train and of said second drive train being interconnected to said tubular arbor forwardly of said central portion, said forward portion of said tubular arbor being adapted to carry four work gripping surfaces.

5. A fluid actuating chuck comprising a chuck body having a rigid rear portion and a forward portion forming four surfaces forwardly of said rear portion and arranged about the axis of rotation of the chuck in opposed pairs, each of said surfaces of the forward portion being independently connected with the rigid rear portion by a central portion adapted to be flexible in such a manner that each surface can be moved generally in a direction perpendicular to the axis of rotation;

the rigid rear portion of the chuck body forming inner and outer coaxial cylinders, one conentrically arranged within the other;

a first piston carried in the inner cylinder and free to move in response to fluid pressure in the direction of the axis of rotation and having a forward end projecting from the chuck within the forward portion of the chuck body, said forward end carrying a first actuating means including two links, each one of said links being connected with one surface of one of the opposed pairs of surfaces in such a manner that movement of the piston in the direction of the axis of rotation will flex the central portions connected with said one of the opposed pairs of surfaces and move each one of the opposed pair of surfaces in a direction generally perpendicular to the axis of rotation;

a second piston carried in the outer cylinder free to move in response to fluid pressure in the direction of the axis of rotation, and having rod means projecting forwardly through the chuck body and carrying a second actuating means;

said second actuating means being mechanically connected to said second piston at its rear and carrying two links, each one of said links being connected with one surface of the other of the opposed pairs of surfaces in such a manner that movement of the second piston in the direction of the axis of rotation will flex the central portions connected with said other of the opposed pair of surfaces and move each one of the opposed pair of surfaces in a direction generally perpendicular to the axis of rotation;

whereby each of said opposed pair of surfaces may be moved independently toward and away from the axis of rotation of said chuck by the application of fluid pressure to said first and second pistons thereby permitting work engaging surfaces mounted thereon to hold and turn a work piece.

6. The chuck of claim 5 wherein the portion of the chuck body forming the inner cylinder and the outer cylinder permits communication of fluid between said cylinders for simultaneous movement of the four surfaces.

7. The chuck of claim 5 wherein the central and forward portions of the chuck body have a smaller diameter than the rear portion, and the second actuating means includes a ring carried about the central and forward portions of the chuck body, said actuator ring being connected to and carried by said rod means including a plurality of rods extending forwardly from said second piston and projecting through said chuck body.

8. In an automatic fluid actuated chuck to engage and rotate a work piece, the improvement comprising means forming two pairs of surfaces carried and rotatably driven by a chuck body, each of the surfaces of said pairs being independently movable generally in the direction of a plane perpendicular to the axis of rotation of the chuck;

a pair of independently movable fluid actuated pistons carried within a pair of cylinders formed within the chuck body;

first actuating means carried by the chuck body and mechanically interconnecting one of said pair of pistons with one pair of surfaces to move said one pair of surfaces generally in a direction of a plane perpendicular to the axis of rotation of the chuck upon the application of fluid under pressure to said one piston; and second actuating means carried by the chuck body and mechanically interconnecting the other of said pair of pistons with the other pair of surfaces to move said other pair of surfaces generally in a direction of a plane perpendicular to the axis of rotation upon the application of fluid under pressure to said piston.

9. The chuck body of claim 8 wherein the means forming two pairs of surfaces carried and rotatably driven by the chuck body is a tubular arbor at the forward most end of the chuck body, and the two pairs of surfaces are formed at the forward portion of the tubular arbor by slots cut into the tubular arbor perpendicular to and through the axis of rotation and perpendicular to each other; wherein one of said pistons is carried within a cylinder formed within the chuck body, is concentric with the axis of rotation and has a forward portion projecting from the chuck body along the axis of rotation and within the tubular shaped arbor; wherein the first actuating means is connected with said one piston and is carried within the tubular arbor;

wherein the other of said pistons is ring-shaped and is carried within the other cylinder formed within the chuck body and coaxially about said one piston and is connected with means projecting forwardly from the chuck body outside of the tubular arbor; and wherein said second actuating means is connected with said ring-shaped piston and is carried outside of said tubular arbor.

10. The chuck body of claim 9 wherein the first actuating means includes a spider attached at the forward end of said piston and two links between said spider and one pair of said surfaces; and said second actuating means includes a ring carried around said tubular arbor by said other piston and two links between said ring and the other pair of said surfaces.

* * * * *